United States Patent Office 3,260,721
Patented July 12, 1966

3,260,721
HETEROCYCLIC DERIVATIVES OF YOHIMBÉ ALKALOIDS
Jay Donald Albright and Leon Goldman, Nanuet, N.Y., assignors to American Cyanamid Company, Stamford, Conn., a corporation of Maine
No Drawing. Filed Jan. 27, 1965, Ser. No. 428,551
16 Claims. (Cl. 260—256.4)

This application is a continuation-in-part of our copending application Serial No. 364,275, filed May 1, 1964, now abandoned, which in turn is a continuation-in-part of our copending application Serial No. 186,321, filed April 10, 1962.

This invention relates to novel ring E heterocyclic derivatives of yohimbé alkaloids and, more particularly, is concerned with novel derivatives of yohimbé alkaloids which may be represented by the following general formula:

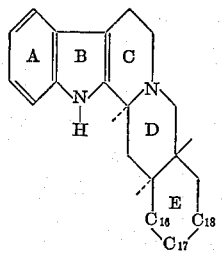

wherein —$C_{16}$—$C_{17}$—$C_{18}$— is a divalent radical selected from the group consisting of:

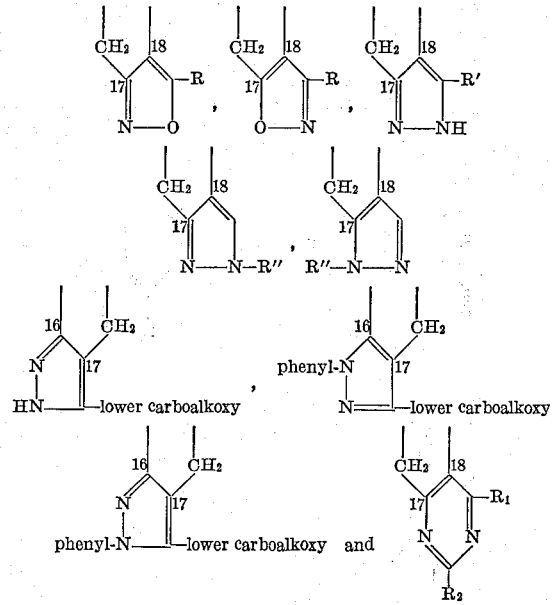

wherein R is hydrogen, lower alkyl, phenyl or substituted phenyl; R' is hydrogen, lower alkyl, lower carboalkoxy, phenyl or substituted phenyl; R'' is lower alkyl, lower alkanoyl, phenyl or trimethoxybenzoyl; $R_1$ is hydrogen, lower alkyl, phenyl or substituted phenyl; and $R_2$ is hydrogen, hydroxy, amino, lower alkylthio, phenyl or substituted phenyl. Suitable substituted phenyl groups contemplated by the present invention are, for example, o-, m-, or p-(lower alkyl)phenyl, o-, m-, or p-(halo)-phenyl, o-, m-, or p-(lower alkoxy)phenyl and 3,4,5-tri-(lower alkoxy)phenyl. Suitable lower alkyl and lower alkoxy groups contemplated by the present invention are those having from 1 to 6 carbon atoms with methyl, ethyl, methoxy and ethoxy being preferred. Suitable lower alkanoyl and lower carboalkoxy groups contemplated by the present invention are those having from 2 to 6 carbon atoms with acetyl, propionyl, carbomethoxy and carbethoxy being preferred. Halogen is exemplified by chlorine and bromine.

The novel compounds of the present invention are, in general, white to tan crystalline solids, the free bases of which are soluble in organic solvents such as lower alkanols, chloroform, dimethylformamide, dioxane, pyridine and the like; and the salts of which are soluble in polar solvents such as water and lower alkanols.

The novel compounds of the present invention are valuable hypotensive agents of low toxicity and may be administered orally or parenterally. When so administered they have been found to exhibit hypotensive action in amounts ranging from about 25 to about 350 milligrams per kilogram of body weight. In addition, the novel compounds of the present invention are valuable central nervous system depressants and have been found to exhibit tranquillizing action similar to reserpine in amounts ranging from about 5 to about 1000 milligrams per kilogram of body weight.

The present invention also embraces the useful non-toxic pharmaceutically acceptable acid-addition salts of these novel compounds. Typical acid-addition salts are the hydrochlorides, hydrobromides, sulfates, citrates, tartrates, succinates, and the like. Although the novel compounds of the present invention may be used as such, they are preferably administered in the form of their non-toxic acid-addition salts which may be readily prepared by treatment with one equivalent of an acid such as hydrochloric, sulfuric, phosphoric, citric, etc. in a suitable solvent.

The novel yohimbano[17,18]isoxazoles, yohimbano-[17,18]pyrazoles and yohimbano[16,17]pyrazoles of the present invention may be prepared from 18-hydroxymethyleneyohimban-17-one, 17-(lower alkoxyoxalyl)yohimban-16-one, 18-(lower alkoxyoxalyl)yohimban-17-one or 18-acylyohimban-17-one. The lower alkoxyoxalylyohimbanones and 18-acylyohimban-17-ones may be prepared from the corresponding yohimbanones which are known to the prior art. Yohimban-17-one has been described by Witkop, Ann. 554, 83 (1943); and yohimban-16-one by Hill et al., J. Org. Chem. 22, 1276 (1957).

The lower alkoxyoxalylyohimbanones may be prepared by treating an alkali metal salt of an appropriate ring E keto yohimbé alkaloid with an appropriate alkyl ester of oxalic acid such as ethyl oxalate. The alkoxyoxalylation is ordinarily carried out in a solvent such as benzene, toluene, ether, xylene, tetrahydrofuran, dimethylformamide, dioxane and methanol. Ordinarily, the appropriate yohimbanone is suspended in the solvent and an alkali metal alkoxide is added, after which the oxalic acid ester is added. The reaction is carried out at a temperature ranging from 0° C. to 50° C., conveniently at room temperature, and for a period of time ranging from an hour or so to several days. When yohimban-17-one is so treated, there is obtained 18α-(lower alkoxyoxalyl)-yohimban-17-one in good yield. When yohimban-16-one is so treated, there is obtained 17β-(lower alkoxyoxalyl)yohimban-16-one in good yield.

The intermediate 18-acylyohimban-17-ones may be prepared from yohimban-17-one which has been described by Witkop, Ann. 554, 83 (1943). The first step in the synthesis consists of the preparation of a yohimban-17-enamine by treatment of yohimban-17-one with a secondary aliphatic amine such as dimethylamine, diethylamine, propylamine, piperidine, pyrrolidine, morpholine, N-methylpiperazine, and the like. This reaction is ordinarily carried out by refluxing (with or without an acid catalyst such as p-toluenesulfonic acid, sulfuric acid, or the like) a mixture of the amine and yohimban-17-one in benzene, toluene, xylene, or some other inert, water immiscible solvent, with azeotropic removal of water, for a period of time ranging from 3 to 24 hours, more or less. Good results are achieved, for example, when the refluxing distillate is passed through a water absorbent such as alumina, anhydrous magnesium sulfate, or the like in a Soxhlet extractor, thereby continuously removing the water azeotropically distilled. The solvent and excess amine are then removed by concentration under vacuum, and the enamine is taken up from the dry residue in chloroform or another suitable inert solvent such as benzene, dioxane, tetrahydrofuran, dichloromethane or the like. The resulting enamine in solution may then be reacted with an appropriate acid halide to prepare the 18-acylyohimban-17-one. This reaction is ordinarily carried out under anhydrous conditions in an inert solvent such as chloroform, dioxane, carbon tetrachloride, dichloromethane, and the like; at temperatures of from about 0° C. to about 100° C.; and over a period of time of from 5 to 24 hours, more or less. An acid acceptor such as triethylamine, quinoline, pyridine, and the like, is preferably employed. After the reaction is complete, the reaction mixture is poured into aqueous mineral acid (e.g., hydrochloric acid, sulfuric acid, etc.), and the resulting mixture stirred at room temperature for 1–5 hours or so. Finally, the mixture is brought to ca. pH 7.5 with aqueous base and the product is extracted with chloroform, benzene, toluene, or the like, and recovered by concentrating the pooled extracts. Purification is effected by conventional means. Acid halides contemplated for the preparation of the requisite 18-acylyohimban-17-ones are the lower alkanoyl halides such as acetyl bromide, propionyl chloride, butyryl chloride, and the like, and aroyl halides such as benzoyl chloride, o-methoxybenzoyl chloride, o-chlorobenzoyl chloride, 3,4,5-trimethoxybenzoyl bromide, etc.

The novel yohimbano[17,18]isoxazoles of the present invention may be prepared by treating 18-hydroxymethyleneyohimban-17-one or an 18-acylyohimban-17-one with hydroxylamine. This reaction is ordinarily carried out in an inert solvent such as ethanol, dioxane, glacial acetic acid and the like, at a temperature of from 25 C. to 150° C., and over a period of time of from 15 minutes to 6 hours, more or less.

The novel yohimbano[17,18]pyrazoles of the present invention may be prepared by treating 18-hydroxymethyleneyohimban-17-one, 18-(lower alkoxyalyl)yohimban-17-one or an 18-acylyohimban-17-one with hydrazine, mono-(lower alkyl)hydrazine or phenylhydrazine. This reaction is ordinarily carried out in an inert solvent such as ethanol, dioxane, glacial acetic acid and the like, at temperatures of from 25° C. to 150° C., and over a period of time of from 15 minutes to 6 hours, more or less. When hydrazine is employed, a ring E heterocyclic derivative is obtained having a nuclear secondary nitrogen atom. This nuclear secondary nitrogen atom may be alkylated or acylated by conventional procedures employing, for example, methyl iodide, ethyl bromide, acetic anhydride, trimethoxybenzoyl chloride, and the like.

The novel yohimbano[16,17]pyrazoles of the present invention may be prepared by treating a 17-(lower alkoxyoxalyl)yohimban-16-one with hydrazine, mono(lower alkyl)hydrazine or phenylhydrazine. This reaction is ordinarily carried out in an inert solvent such as ethanol, dioxane, glacial acetic acid and the like, at temperatures of from 25° C. to 150° C., and over a period of time of from 15 minutes to 6 hours, more or less. When hydrazine is employed, a ring E heterocyclic derivative is obtained having a nuclear secondary nitrogen atom. This nuclear secondary nitrogen atom may be alkylated or acylated by conventional procedures employing, for example, methyl iodide, ethyl bromide, acetic anhydride, trimethoxybenzoyl chloride, and the like.

The novel yohimbano[17,18]pyrimidines of the present invention may be prepared by the following reactions, or by obvious combinations or variations thereof, which also form a part of the present invention. In the following schematic representations, only the E ring of the yohimbane structure is shown for purposes of brevity.

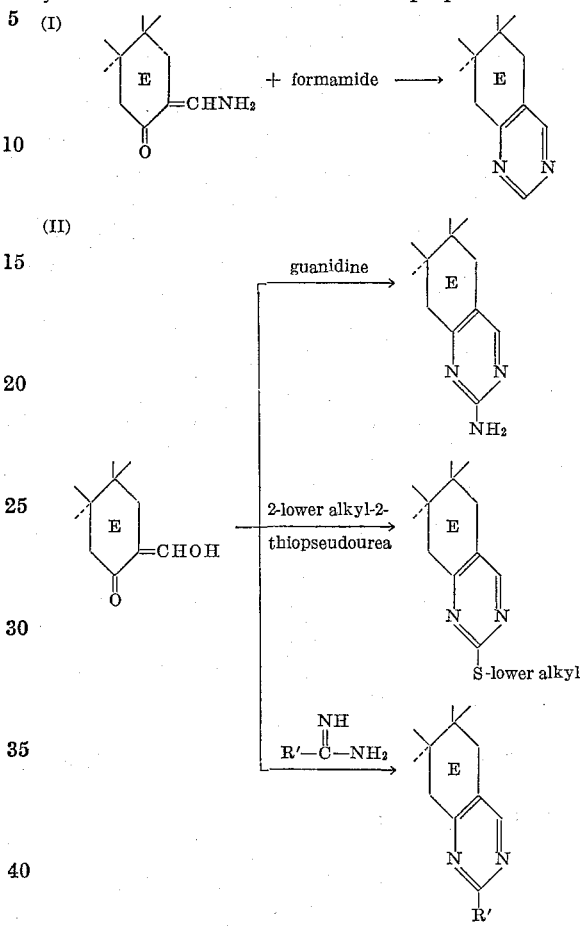

wherein R' is phenyl or substituted phenyl

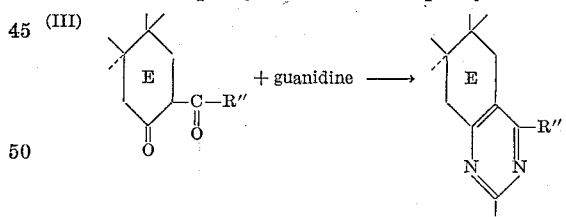

wherein R'' is lower alkyl, phenyl or substituted phenyl

With respect to Reaction (I), treatment of 18-aminomethyleneyohimban-17-one with formamide is ordinarily carried out in a polar, non-acidic solvent such as ethanol, dioxane and the like at the reflux temperature of the solvent. Depending upon the solvent chosen, the temperature of the reaction may range from about 50° C. to about 200° C. and preferably from about 70° C. to about 130° C. The duration of the reaction may be from about 2 to about 5 hours, more or less. The product is isolated from the reaction mixture by conventional methods and is then purified by recrystallization from a solvent such as acetone or methanol.

With respect to Reaction (II), treatment of 18-hydroxymethylyohimban-17-one is ordinarily carried out in a polar, non-acidic solvent such as ethanol, dioxane and the like. Depending upon the solvent employed, the temperature of the reaction may range from about 50° C. to about 200° C. and preferably from about 70° C. to about 130° C. The duration of the reaction may be from about 10 to about 24 hours, more or less. The indicated reagents are preferably employed in the form of their salts such as, for example, guanidine carbonate, 2-methyl-2-thiopseudourea sulfate, benzamidine hydrochloride, m-chlorobenzamidine hydrochloride, etc. For this reason, the reaction is preferably carried out in the presence of a stoichiometric amount of a base, such as potassium hydroxide or sodium hydroxide, in order to neutralize the acid moiety of the reagent salt. The product is isolated by conventional methods and may then be recrystallized from a solvent such as methanol, ethanol, etc.

With respect to Reaction (III), treatment of an 18-acylyohimban-17-one with guanidine carbonate is ordinarily carried out in a polar, non-acidic solvent such as ethanol, dioxane, and the like at the reflux temperature of the solvent. Depending upon the solvent chosen, the temperature of the reaction may range from about 50° C. to about 200° C. and preferably from about 70° C. to about 130° C. The duration of the reaction may be from about 10 to about 24 hours, more or less. The product is isolated by conventional methods and may then be recrystallized from a solvent such as methanol, benzene, etc.

With respect to Reaction (IV), the hydrolysis of the 2'-(lower alkyl)thioyohimbano[17,18-4',5']pyrimidines is conveniently carried out in concentrated hydrochloric acid by refluxing for a period of time of from about 2 to about 5 hours. The product is isolated by conventional methods and may then be recrystallized from a solvent such as methanol, ethanol, etc.

The novel compounds of the present invention may be administered either as the free base or as a non-toxic acid-addition salt thereof. The compounds may be administered orally or parenterally, if desired, and when so administered are active central nervous system depressants, at individual doses ranging from about 5 to about 1000 milligrams per kilogram of body weight. The dosage level can be adjusted to provide optimum therapeutic response. Thus, for example, several doses may be administered daily or the dose may be reduced proportionately as indicated by the exigencies of the therapeutic situation.

For therapeutic administration, the active compounds of this invention may be incorporated with excipients and used, for example, in the form of tablets, troches, capsules, elixirs, suspensions, syrups, wafers, chewing gum and the like. Such compounds and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that a dosage unit form contains between about 10 and about 200 milligrams of active compound.

The tablets, troches, pills, capsules and the like may contain the following: a binder such as gum tragacanth, acacia, corn starch or gelatin; a disintegrating agent such as a corn starch, potato starch, alginic acid and the like; a lubricant such as magnesium stearate; and a sweetening agent such as sucrose or saccharin may be added or a flavoring agent such as peppermint, oil of wintergreen or cherry flavoring.

A syrup or elixir may contain the active compounds in the form of their non-toxic acid-addition salts, sucrose as a sweetening agent, methyl and propyl parabens as preservatives, a dye and a flavoring such as cherry or orange flavor.

It is to be understood that certain of the novel compounds of the present invention may theoretically exist in other tautomeric forms according to the following tautomeric schemes:

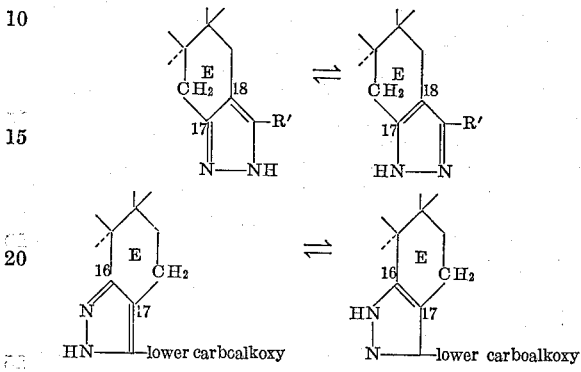

wherein only ring E of the yohimbane structure is represented for purposes of simplicity and wherein R' is as previously defined. These various tautomeric forms are also included within the purview of the present invention.

The following examples are given solely for the purpose of illustration and are not to be construed as limitations of this invention, many apparent variations of which are possible without departing from the spirit or scope thereof.

EXAMPLE 1

*Preparation of pyrolidine enamine of yohimban-17-one*

A mixture of 2.94 g. (0.010 mole) of yohimban-17-one, 5.0 g. of dry redistilled pyrrolidine, and 50 ml. of sodium dried benzene was refluxed for 18 hours in a Soxhlet extractor, the thimble of which contained anhydrous alumina to remove the water azeotropically distilled. The resulting solution was concentrated under reduced pressure. The residue was dissolved in 25 ml. of dry chloroform and the solvent again removed under reduced pressure. The reddish glass was heated at 90–100° C. under high vacuum for 2 hours to remove the last traces of pyrrolidine to yield the pyrrolidine enamine of yohimban-17-one.

EXAMPLE 2

*Preparation of 18-acetylyohimban-17-one*

A solution of the pyrrolidine enamine, prepared as in Example 1, from 14.7 g. of yohimban-17-one, in 100 ml. of chloroform was cooled by means of an ice bath and treated consecutively with 8.0 ml. of dry triethylamine and 3.93 g. of acetyl chloride. After being allowed to stand at room temperature under nitrogen for 17 hours, the mixture was treated with 50 ml. of water and 15 ml. of glacial acetic acid, and stirred for 1.5 hours. The pH of the mixture was adjusted to 7.0 with dilute ammonium hydroxide and the chloroform layer separated. The aqueous layer was extracted with four 100-ml. portions of chloroform and the combined chloroform extracts were washed with 200 ml. of water, dried over sodium sulfate, and concentrated under reduced pressure. The residual solid was triturated with ethanol to give 14.1 g. of crystals. By repeated recrystallizations from methanol, and then from ethyl acetate, yohimban-17-one was separated from the product and there was obtained 3.74 g. of 18-acetylyohimban-17-one as tan crystals, melting point 223–226° C., dec.

EXAMPLE 3

*Preparation of 18-propionylyohimban-17-one*

A solution of the pyrrolidine enamine of yohimban-17-one (0.025 mole) in 72 ml. of dry dichloromethane and 25 ml. of triethyleamine was treated with 2.0 ml. of propionyl chloride. The mixture was cooled briefly and allowed to stand at room temperature for 46 hours. The solvent was removed under reduced pressure, and the residue dissolved in 60 ml. of chloroform. The solution was poured onto a mixture of 75 g. of ice and 20 ml. of glacial acetic acid and, after being stirred at room temperature for 3 hours, the mixture was brought to pH 7.5 with concentrated ammonium hydroxide. Chloroform (150 ml.) was added and to the emulsion which formed was added 50 ml. of ethanol and 50 ml. of water. The organic layer was separated and the aqueous layer extracted with five 100-ml. portions of chloroform. The combined extracts were dried over magnesium sulfate and the solvent was removed under reduced pressure. By crystallization of the residue from ethanol, aqueous ethanol, aqueous acetone, and ethyl acetate, yohimban-17-one and other impurities were separated from the product which remained as the most soluble component. In this way the product was obtained as a benzene soluble glass which was precipitated by dilution of the benzene solution with cyclohexane. The 18-propionylyohimban-17-one was obtained as a tan amorphous solid, melting point 154–159° C., dec.

EXAMPLE 4

*Preparation of 18-benzoylyohimban-17-one*

The pyrrolidine enamine, prepared as in Example 1, from 2.94 g. of yohimban-17-one, was dissolved in 20 ml. of dry chloroform. The solution was cooled by means of an ice bath and 1.40 ml. of dry triethylamine was added. To this red-brown solution was added 0.93 ml. of benzoyl chloride. The mixture was allowed to stand under nitrogen at room temperature for 19 hours and then was treated with 20 ml. of acetic acid-water (1:1). After stirring for 1 hour, the mixture was brought to pH 7.0 with dilute ammonium hydroxide, and diluted with an additional 25 ml. of chloroform. After filtering, the organic layer was separated and the aqueous layer extracted with three 50-ml. portions of chloroform. The organic layer and chloroform extracts were combined, dried over sodium sulfate, and concentrated to a glass under reduced pressure. The glass was triturated with 60 ml. of hot methanol. Cooling and filtering gave 1.48 g. of crystals, melting point 200–220° C., dec. Several recrystallizations from acetone-water gave 0.330 g. of 18-benzoylyohimban-17-one as tan needles, melting point 231–235° C., dec.

EXAMPLE 5

*Preparation of 18-(p-bromobenzoyl)yohimban-17-one*

A solution of the pyrrolidine enamine of yohimban-17-one (0.025 mole) in 72 ml. of dry dichloromethane and 25 ml. of dry triethylamine was treated with 4.94 g. of p-bromobenzoyl chloride. The mixture was cooled by means of an ice bath and allowed to stand under nitrogen at room temperature for 18 hours. The solvent was removed under reduced pressure, and the residue dissolved in 50 ml. of chloroform and poured onto a mixture of 75 g. of ice and 20 ml. of glacial acetic acid. After being stirred at room temperature for 2 hours, the mixture was cooled and brought to pH 7.5 with concentrated ammonium hydroxide. Chloroform (50 ml.) was added and the organic layer was extracted with four 100-ml. portions of chloroform. The combined chloroform extracts were dried over magnesium sulfate and the solvent removed under reduced pressure. Benzene was added to the residue and the solvent removed under reduced pressure. Trituration of the residue with ethanol and filtration gave 5.42 g. of brown crystals. Recrystallization from acetone with the aid of activated carbon gave 1.60 g. of yohimban-17-one and 3.75 g. of impure 18-(p-bromobenoyl)yohimban-17-one. Recrystallization from ethanol and from acetone gave the product as light yellow rods, melting point 241–244° C., dec.

EXAMPLE 6

*Preparation of 18-(p-toluyl)yohimban-17-one*

A solution of the pyrrolidine enamine of yohimban-17-one (0.025 mole) in 72 ml. of dry dichloromethane and 25 ml. of dry triethylamine was treated with 3.48 g. of p-toluyl chloride. The mixture was cooled briefly by means to an ice bath and allowed to stand at room temperature under nitrogen for 19 hours. The solvent was removed under reduced pressure and the residue was dissolved in 50 ml. of chloroform and poured onto a mixture of 75 g. of ice and 20 ml. of glacial acetic acid. The mixture was stirred for two hours at room temperature and brought to pH 7.5 with concentrated ammonium hydroxide. Chloroform (50 ml.) was added and the organic layer separated. The aqueous layer was extracted with four 100-ml. portions of chloroform, the combined extracts were dried over magnesium sulfate, and the solvent removed under reduced pressure. Benzene was added to the residue and the solvent removed under reduced pressure. The residue was triturated with 150 ml. of ethanol and the gel which formed was removed by filtration and washed with ethanol. The gel was dried under reduced pressure over phosphorus pentoxide at room temperature. The dried solid (6.58 g.) was crystallized from aqueous acetone with the aid of activated carbon to yield 5.50 g. of impure 18-(p-toluyl)yohimban-17-one, melting point sinters above 130° C. to a viscous mass which then slowly melts. Recrystallization from aqueous acetone gave the product as tan crystals, melting point 190–195° C., dec. (sinters to a viscous mass above 130° C.).

EXAMPLE 7

*Preparation of 18-(3,4,5-trimethoxybenzoyl)yohimban-17-one*

The pyrrolidine enamine, prepared as in Example 1, from 2.94 g. of yohimban-17-one, was dissolved in 20 ml. of dry chloroform. The solution was cooled by means of an ice bath and 1.40 ml. of dry triethylamine was added. To this solution was added 1.84 g. of 3,4,5-trimethoxybenzoyl chloride. The mixture was allowed to stand at room temperature under nitrogen for 18 hours and then was treated with dilute acetic acid. After stirring at room temperature for one hour, the mixture was diluted with 25 ml. of chloroform and brought to pH 7.5 with dilute ammonium hydroxide. The organic layer was separated and the aqueous layer extracted with chloroform. The organic layer and the chloroform extracts were combined, washed with 25 ml. of a saturated sodium bicarbonate solution, dried over sodium sulfate, and concentrated under reduced pressure to a reddish glass. The glass was dissolved in ethanol, treated with activated charcoal, and the solution filtered. Concentration of the filtrate under reduced pressure afforded a glass which was crystallized from aqueous ethanol to give 0.91 g. of pink crystals, melting point 200–205° C., dec. The crystals were dissolved in chloroform:ethanol (1:1) and the solution concentrated to 25 ml. A gel formed and 10 ml. of acetone was added. Dilution with water and filtration gave 0.454 g. of 18-(3,4,5-trimethoxybenzoyl)yohimban-17-one as tan needles, melting point 222–228° C., dec.

EXAMPLE 8

*Preparation of 18-hydroxymethyleneyohimban-17-one*

To a cooled mixture of 10.0 g. of yohimban-17-one, 10.0 g. of sodium methoxide, and 300 ml. of sodium-dried benzene was added 14 ml. of ethyl formate. The mixture was stirred under nitrogen at room temperature for 20 hours and poured onto a mixture of 300 g. of ice and 200 ml. of water. The organic layer was separated and washed with three, 100-ml. portions of 0.1 N sodium hydroxide. The basic washings and aqueous layer were combined and neutralized in the cold with acetic acid. Filtration afforded 9.4 g. of 18-hydroxy methyleneyohimban-17-one hemihydrate as tan crystals, M.P. 140°–147° C. On standing in the cold overnight, the mother liquor gave an additional 1.8 g. of crystals. Recrystallization from methanol afforded colorless needles, sintering to a glass at 145°–148° C., M.P. 207°–210° C., dec.

EXAMPLE 9

*Preparation of 18-hydroxymethyleneyohimban-17-one*

A mixture of 5.0 g. of yohimban-17-one, 5.0 g. of sodium methoxide, 150 ml. of dry peroxide-free dioxane, and 7.0 ml. of ethyl formate was stirred at room temperature under nitrogen for 21 hours. The mixture was neutralized with acetic acid and concentrated nearly to dryness. The residue was crystallized from aqueous methanol to yield 5.3 g. of 18-hydroxymethyleneyohimban-17-one hemihydrate as tan crystals, sintering to a glass at 145°–154° C., M.P. 207°–210° C., dec.

EXAMPLE 10

*Preparation of 18-aminomethyleneyohimban-17-one*

A mixture of 45.0 g. of yohimban-17-one, 45.0 g. of sodium methoxide, 63 ml. of ethyl formate and 1.3 l. of dioxane was stirred under argon at room temperature for 21 hours. The mixture was adjusted to pH 5.0 with acetic acid and the solvent removed under reduced pressure. The residue was treated with 220 ml. of methanol and 450 ml. of water and the solvent was again removed under reduced pressure. The residue was treated with concentrated ammonium hydroxide until the pH was adjusted to 7.0. The mixture was filtered and the precipitate was slurried with methanol. Filtration gave 25 g. of 18-aminomethyleneyohimban-17-one as tan crystals, M.P. 310–318° C., dec., with sintering to a dark mass above 270° C.

EXAMPLE 11

*Preparation of ethyl 17-oxoyohimban-18α-glyoxylate*

A mixture of 5.0 g. of yohimban-17-one, 1.0 g. of sodium methoxide and 17.0 ml. of freshly distilled ethyl oxalate in 250 ml. of dry benzene was stirred at room temperature for 20 hours. The dark brown-red suspension was diluted with 500 ml. of cold, dry ether and filtered. The residue was treated with 150 ml. of cold water and a few drops of 10 N sodium hydroxide (pH about 9) and the nearly clear suspension was rapidly extracted with two 100-ml. portions of ethyl acetate. The alkaline aqueous phase was separated and neutralized with dilute acetic acid. A voluminous precipitate formed which was filtered and dried at room temperature under high vacuum to yield 3.41 g. of ethyl 17-oxoyohimban-18α-glyoxylate. The crude product was crystallized from methanol to give yellowish-brown crystals, M.P. 215°–216° C. (dec.).

EXAMPLE 12

*Preparation of ethyl 16-oxoyohimban-17β-glyoxylate*

A mixture of 0.589 g. of yohimban-16-one, 0.118 g. of sodium methoxide and 2.0 ml. of ethyl oxalate in 40 ml. of dry benzene was stirred under nitrogen at room temperature for 20 hours. The mixture was treated with 5 drops of glacial acetic acid, poured into 75 ml. of ether, and filtered. The filtrate was washed with two 25-ml. portions of water, dried over sodium sulfate and the solvent removed under vacuum. The residue was dissolved in 15 ml. of hot ethanol, the solution was chilled and filtered, and the filtrate was diluted with 10 ml. of water and chilled. Filtration afforded 0.205 g. of a tan powder, M.P. 193°–196° C. (dec.) (when inserted in a bath preheated to 180° C.). The powder was dissolved in 4.0 ml. of hot ethanol, treated with activated charcoal, filtered and chilled. The mixture was filtered from a small amount of orange solid and the filtrate diluted with 15 ml. of water. Chilling and filtering afforded 0.107 g. of ethyl 16-oxoyohimban-17β-glyoxylate as a tan powder, M.P. 192°–195° C. (dec.) (when inserted in an oil bath preheated to 180° C.).

EXAMLE 13

*Preparation of yohimbano[17,18-c]isoxazole and yohimbano[18,17-d]isoxazole hydrochlorides*

A mixture of 1.0 g. of 18-hydromethyleneyohimban-17-one, 0.225 g. of hydroxylamine hydrochloride and 15 ml. of glacial acetic acid was heated in an oil bath at 100° C. for 6 minutes. The mixture was cooled and filtered to give 0.43 g. of colorless needles. Recrystallization from aqueous methanol afforded 0.148 g. of a mixture of hydrochlorides of yohimbano[17,18-c]isoxazole and yohimbano[18,17-d]isoxazole as colorless needles, melting point 310°–315° C. (dec.), containing one-fourth mole of water of crystallization.

A mixture (7.8 g.) of the hydrochlorides of yohimbano[17,18-c]isoxazole and yohimbano[18,17-d]isoxazole was stirred with 3.2 g. of sodium methoxide in 60 ml. of methanol for two hours. The mixture was filtered and washed with 30 ml. of methanol. The solid was washed thoroughly with water, dried and dissolved in methanol-dichloromethane. The solution was concentrated on a steam bath until crystals separated. There was obtained 1.12 g. of crude yohimbano[17,18-c]isoxazole, M.P. 250°–260° C. dec. The solid was stirred with 0.30 g. of sodium methoxide in 10 ml. of methanol for 18 hours. The mixture was filtered and the solid washed with 10 ml. of methanol and two 10-ml. portions of water. The solid was dissolved in methanol-dichloromethane and concentrated until crystals separated. There was obtained 0.725 g. of yohimbano[17,18-c]isoxazole as tan needles, M.P. 265°–272° C. dec.

EXAMPLE 14

*Preparation of 5'-methylyohimban[17,18-c]isoxazole and 3'-methylyohimban[18,17-d]isoxazole*

A mixture of 4.04 g. of 18-acetylyohimban-17-one, 0.973 g. of hydroxylamine hydrochloride and 300 ml. of ethanol was refluxed for 3 hours. After standing overnight, the mixture was filtered to give 3.8 g. of the product hydrochloride as tan crystals, melting point 323°–327° C., dec. The crystals were dissolved in 400 ml. of hot ethanol-water (1:1) and the solution made basic with 10 N sodium hydroxide. The mixture was chilled and filtered to give 2.83 g. of a mixture of 5'-methylyohimbano [17,18-c]isoxazole and 3'-methylyohimbano[17,18-d]isoxazole as tan crystals, melting point 265°–268° C., dec.

EXAMPLE 15

*Preparation of 5'-p-tolylyohimbano[17,18-c]isoxazole and 3'-p-tolylyohimbano[18,17-d]isoxazole*

A mixture of 1.36 g. of 18-(p-toluyl)yohimban-17-one, 0.278 g. of hydroxylamine hydrochloride and 100 ml. of ethanol was refluxed for 4.5 hours. The solvent was removed under reduced pressure and the residue partitioned between chloroform and dilute aqueous ammonium hydroxide. The chloroform layer was separated and the aqueous layer extracted with chloroform. The combined chloroform extracts were washed with water, dried over magnesium sulfate and concentrated under reduced pressure to give 1.43 g. of light tan crystals. The product was recrystallized by dissolving in 300 ml. of chloroform-ethanol (50:50) and concentrating the solution on a steam bath to 200 ml. Chilling and filtering gave 0.760 g. of a mixture of 5'-p-tolylyohimbano[17,18-c]isoxazole and 3'-p-tolylyohimbano[18,17-d]isoxazole as light tan needles, M.P. 300°–302° C., dec. (sinters above 280° C.).

EXAMPLE 16

*Preparation of yohimbano[17,18-c]pyrazole*

A mixture of 5.0 g. of 18-hydroxymethyleneyohimban-17-one, 0.80 ml. of hydrazine hydrate and 100 ml. of ethanol was refluxed for one-half hour. After standing overnight the solvent was removed under reduced pressure to give 5.93 g. of a brown glass. The glass was dissolved in methanol, treated with activated charcoal, filtered and the filtrate diluted with water to give 4.61 g. of yohimbano [17,18-c]pyrazole as tan crystals, melting point 234–238° C. dec. (with previous sintering). Recrystallization from aqueous methanol afforded cream-colored crystals, melting point 241°–244° C. dec. (with previous sintering).

EXAMPLE 17

*Preparation of yohimbano[17,18-c]pyrazole dihydrochloride*

A mixture of 2.0 g. of 18-hydroxymethyleneyohimban-17-one, 0.64 g. of hydrazine dihydrochloride and 100 ml. of methanol was warmed on a steam bath for 5 minutes. The mixture was allowed to stand overnight and methanol was added until all the solid dissolved. After treatment with activated charcoal the mixture was concentrated to 75 ml. After chilling and filtering, 1.48 g. of yohimbano[17,18-c]pyrazole dihydrochloride was obtained as tan plates, melting point 300–305° C. Recrystallization from methanol with the aid of activated charcoal gave cream-colored plates, M.P. 301°–305° C., containing one-fourth mole of water of crystallization.

EXAMPLE 18

*Preparation of 5'-methylyohimbano[17,18-c]pyrazole*

A mixture of 6.73 g. of 18-acetylyohimban-17-one hydrochloride, 150 ml. of ethanol and 1.0 ml. of hydrazine hydrate was stirred at room temperature under nitrogen for 45 minutes and then refluxed for 3.5 hours. After standing overnight the solvent was removed under reduced pressure to give the hydrochloride as tan crystals, melting point 343–347° C. dec. The crystals were partitioned between 200 ml. of chloroform, 50 ml. of ethanol, and 200 ml. of dilute aqueous sodium hydroxide. The chloroform layer was separated and the aqueous layer extracted with three 100-ml. portions of chloroform. The combined extracts were dried over magnesium sulfate and the solvent removed under reduced pressure to give 7.3 g. of a tan glass. The glass was dissolved in dichloromethane and chromatographed over alumina. The product was eluted with dichloromethane-methanol (90:10) and crystallized from aqueous methanol to give 3.71 g. of tan crystals, melting point 304–308° C. dec. Recrystallization from aqueous methanol gave 2.90 g. of 5'-methylyohimbano[17,18-c]pyrazole as tan crystals, melting point 310–313° C. dec.

EXAMPLE 19

*Preparation of ethyl yohimbano[17,18-c]pyrazole-5'-carboxylate*

To 0.495 g. of ethyl 17-oxoyohimban-18α-blyxoylate in 35 ml. of absolute ethanol was added 0.06 ml. of hydrazine hydrate and the reaction mixture was refluxed for one and one-half hours. After standing overnight, the solvent was removed under reduced pressure to give 0.46 g. of a yellow glass. Purification was accomplished by treatment with activated charcoal in a mixture of absolute ethanol and methylene chloride, by precipitation from solution by concentration of the filtrate and addition of ether, and by crystallization from aqueous ethanol to give 0.244 g. of tan crystals, melting point 283°–286° C. dec. Recrystallization from aqueous ethanol afforded ethyl yohimbano[17,18-c]pyrazole-5'-carboxylate as cream colored crystals, melting point 289–293° C. dec.

EXAMPLE 20

*Preparation of 5'-phenylyohimbano[17,18-c]pyrazole*

A mixture of 0.160 g. of 18-benzoylyohimban-17-one, 0.030 g. of hydrazine hydrate and 6.0 ml. of ethanol was refluxed for 20 minutes and allowed to stand at room temperature for 5.0 hours. The solvent was removed under reduced pressure to give a tan glass. The glass was crystallized from ethanol-water with the aid of activated charcoal to give 0.087 g. of tan needles, melting point 232–238° C. dec. Recrystallization from aqueous ethanol gave 0.050 g. of 5'-phenylyohimbano[17,18-c]pyrazole as tan needles, melting point 280–284° C. dec.

EXAMPLE 21

*Preparation of 5'-(3,4,5-trimethoxyphenyl)yohimbano-[17,18-c]pyrazole*

A mixture of 4.44 g. of 18-(3,4,5-trimethoxybenzoyl)-yohimban-17-one, 0.48 ml. of hydrazine hydrate and 75 ml. of ethanol was refluxed for 1.5 hours and allowed to stand overnight at room temperature. The solvent was removed under reduced pressure to give a glass. The glass was crystallized from aqueous methanol to give 3.20 g. of tan crystals, M.P. 200–210° C. dec. Recrystallization from methanol gave 2.55 g. of 5'-(3,4,5-trimethoxyphenyl)yohimbano[17,18-c]pyrazole as tan crystals, melting point, slowly melts and decomposes above 200° C. (sinters 190–200° C.). A 0.300 g. sample was recrystalllized from methanol with the aid of activated charcoal to give 0.225 g. of white crystals, melting point, slowly melts and decomposes above 210° C. (sinters 190–210° C.).

EXAMPLE 22

*Preparation of 1'-methylyohimbano[17,18-c]pyrazole and 1'-methylyohimbano[18,17-d]pyrazole*

A mixture of 16.6 g. of 18-hydroxymethyleneyohimban-17-one, 2.40 g. of methylhydrazine and 300 ml. of ethanol was allowed to stand overnight at room temperature and was refluxed for 2.0 hours. The solvent was removed under reduced pressure to give a brown glass. The glass was triturated with 400 ml. of hot ether. Filtration gave 8.0 g. of 1'-methylyohimbano[17,18-c]pyrazole as tan crystals, melting point 235–239° C. dec. The filtrate was concentrated under reduced presure to a yellow glass which was dissolved in ethanol, treated with activated charcoal, filtered and the filtrate diluted with water. There was obtained 1.18 g. of 1'-methylyohimbano[18,-17-d]pyrazole as pale yellow crystals, melting point 159–164° C.; recrystallization twice from ethanol gave 0.580 g. of off-white crystals, melting point 245–250° C. dec. Recrystallization of the 8.0 g. of ether insoluble solid from ethyl acetate and from methanol with the aid of activated charcoal gave 4.0 g. of tan crystals, melting point 255–260° C. dec.

EXAMPLE 23

*Preparation of 1'-phenylyohimbano[17,18-c]pyrazole and 1'-phenylyohimbano[18,17-d]pyrazole*

A mixture of 5.0 g. of 18-hydroxymethyleneyohimban-17-one, 1.05 ml. of phenylhydrazine and 100 ml. of ethanol was refluxed for 30 minutes. After standing overnight, the solvent was removed under reduced pressure to give 6.55 g. of a brown glass. The glass was crystallized from wet ethyl acetate to give 3.91 g. of brown crystals, melting point 195–212° C. dec., of a mixture of 1'-phenylyohimbano[17,18-c]pyrazole and 1'-phenylyohimbano [18,17-d]pyrazole. Recrystallization from aqueous methanol gave 1.44 g. of 1'-phenylyohimbano[18,17-d]pyrazole as tan crystals, melting point 195°–202° C. dec.; which when recrystallized from ethyl acetate afforded 1.15 g. of tan needles, melting point 203°–207° C. dec. From the mother liquors 1.20 g. of 1'-phenylyohimbano [17,18-c]pyrazole was obtained as tan crystals, melting point 220°–232° C. dec. (with previous sintering); which when recrystallized from ethyl acetate with the aid of activated charcoal afforded tan irregular plates, melting point 248°–255° C. dec. (with previous sintering).

EXAMPLE 24

*Preparation of 1'-(3,4,5-trimethoxybenzoyl)yohimbano [17,18-c]pyrazole*

To a chilled mixture of 1.0 g. of yohimbano[17,18-c] pyrazole and 0.84 ml. of triethylamine in 45 ml. of dry chloroform was added 0.79 g. of 3,4,5-trimethoxybenzoyl chloride. The mixture was stirred at room temperature for 18 hours. The resulting brown solution was washed with saturated sodium bicarbonate solution and dried over anhydrous magnesium sulfate. The filtered solution was concentrated to dryness under reduced pressure. The residual yellow glass was triturated with 60 ml. of absolute ethanol and filtered to yield 1.05 g. of pale yellow needles, melting point 234°–236° C. dec., of 1'-(3,4,5-trimethoxybenzoyl)yohimbano[17,18-c]pyrazole.

EXAMPLE 25

*Preparation of ethyl yohimbano[16,17-c]pyrazole-5'-carboxylate*

A mixture of 0.60 g. of ethyl 16-oxoyohimbano-17β-glyoxylate, 0.08 ml. of hydrazine hydrate and 25 ml. of ethanol was refluxed on a steam bath for 30 minutes and allowed to stand at room temperature overnight. The solvent was removed under reduced pressure to give 0.547 g. of an orange glass. The glass was crystallized from ethyl acetate to give 0.18 g. of ethyl yohimbano[16,17-c]pyrazole-5'-carboxylate as tan crystals, melting point 270°–275° C. dec. (with sintering at 150°–155° C.) Recrystallization from ethyl acetate with the aid of activated charcoal gave colorless crystals, melting point 277°–283° C. dec. (with sintering at 150° C.), containing three-fourths of a mole of water of crystallization.

EXAMPLE 26

*Preparation of ethyl 1'-phenylyohimbano[16,17-c]pyrazole-5'-carboxylate and ethyl 1'-phenylyohimbano[17,16-d]pyrazole-3'-carboxylate*

A mixture of 0.40 g. of ethyl 16-oxoyohimban-17β-glyoxylate, 0.11 ml. of phenylhydrazine and 25 ml. of ethanol was refluxed for 30 minutes and allowed to stand overnight at room temperature. The solvent was removed under reduced pressure to give 0.58 g. of a glass. The glass was crystallized from ethanol with the aid of activated charcoal to give ethyl 1'-phenylyohimbano[16,17-c]pyrazole-5'-carboxylate and ethyl 1'-phenylyohimbano[17,16-d]pyrazole-3'-carboxylate as tan crystals, melting point 238°–245° C., dec. Recrystallization from ethanol afforded colorless needles, melting point 236°–240° C. dec. and containing one-half mole of water of crystallization.

EXAMPLE 27

*Preparation of 2'-amino-6'-methylyohimbano[17,18-4',5']pyrimidine*

A mixture of 1.35 g. of 18-acetylyohimban-17-one, 0.378 g. of guanidine carbonate and 80 ml. of ethanol was refluxed under nitrogen for 24 hours. The solvent was removed under reduced pressure and the residue partitioned between 100 ml. of water and 100 ml. of chloroform. The chloroform layer was separated and the aqueous layer extracted with five 50-ml. portions of chloroform. The combined extracts were dried over magnesium sulfate and concentrated under reduced pressure to give 1.10 g. of a tan solid. Crystallization of the solid from methanol afforded 0.53 g. of 2'-amino-6'-methylyohimbano-17,18-4',5']pyrimidine as pale yellow crystals, M.P. 290–295° C. dec. (with sintering and decomposition above 260° C.)

EXAMPLE 28

*Preparation of 2'-amino-6'-phenylyohimbano[17,18-4',5']pyrimidine*

A mixture of 1.0 g. of 18-benzoylyohimban-17-one, 0.23 g. of guanidine carbonate and 50 ml. of ethanol was refluxed for 23 hours. The solvent was removed under reduced pressure and the residue partitioned between 50 ml. of water and 50 ml. of chloroform. The chloroform layer was separated and the aqueous layer extracted with two 30-ml. portions of chloroform. The combined chloroform extracts were dried over sodium sulfate and concentrated under reduced pressure to give 1.13 g. of a gum. Crystallization from aqueous methanol with the aid of activated charcoal gave 0.44 g. of 2'-amino-6'-phenylyohimbano-17,18-4',5']pyrimidine as tan crystals, M.P. sinters to a glass above 170° C. and changes to a viscous mass above 188° C. and then slowly melts with decomposition. A sample on further recrystallization from methanol melted slowly above 200° C. with decomposition (with previous sintering above 185° C.).

EXAMPLE 29

*Preparation of 2'-amino-6'-(p-bromophenyl)yohimbano[17,18-4',5']pyrimidine*

A mixture of 1.0 g. of 18-(p-bromobenzoyl)yohimban-17-one, 0.20 g. of guanidine carbonate and 50 ml. of ethanol was refluxed for 22 hours. The solvent was removed under pressure and the residue was washed thoroughly with water. The solid (1.75 g.) was dissolved in methanol, treated with activated charcoal, filtered and the filtrate diluted with water until the solution became cloudy. Cooling and filtering gave 0.230 g. of tan amorphous solid. The solid was crystallized from benzene to give 0.100 g. of product. Recrystallization from acetone gave 2' - amino - 6' - (p - bromophenyl)yohimbano[17,-18-4',5']pyrimidine as tan crystals, M.P. 207–211° C. dec.

EXAMPLE 30

*Preparation of yohimbano[17,18-4',5']pyrimidine*

A mixture of 10.0 g. of 18-aminomethyleneyohimban-17-one and 70 ml. of formamide was stirred and heated under nitrogen at 185° C. for 4 hours. The mixture was cooled and poured into 450 ml. of cold water. Filtration gave a tan solid which was washed with water and then triturated with 250 ml. of hot methanol. Chilling and filtering gave 4.7 g. of tan crystals. These crystals were combined with 1.1 g. of product from a similar run and recrystallized from acetone with the aid of activated charcoal to give 2.58 g. of yohimbano[17,18-4',5']pyrimidine as tan crystals, M.P. 273–276° C. dec. A sample was recrystallized twice from methanol to give light tan rods, M.P. 278–281° C. dec.

EXAMPLE 31

*Preparation of 2'-aminoyohimban[17,18-4',5']pyrimidine*

A mixture of 3.40 g. of 18-hydroxymethyleneyohimban-17-one, 0.95 g. of guanidine carbonate and 200 ml. of ethanol was refluxed for 20 hours. The solvent was removed under reduced pressure to give 4.50 g. of tan crystals which were treated with 200 ml. of chloroform and 100 ml. of water. The chloroform layer was separated and the aqueous layer extracted with two 50-ml. portions of chloroform. The chloroform extracts were combined, dried over sodium sulfate and concentrated under reduced pressure to give 3.55 g. of tan crystals. Recrystallization from methanol afforded 1.45 g. of 2'-aminoyohimbano[17,18-4', 5']pyrimidine as tan crystals, M.P. 317–322° C. dec.

EXAMPLE 32

*Preparation of 2'-methylthioyohimbano[17,18-4',5']pyrimidine*

To a mixture of 10.20 g. of 18-hydroxymethyleneyohimban-17-one, 4.32 g. of 2-methyl-2-thiopseudourea sulfate and 200 ml. of ethanol was added 1.74 g. of potassium hydroxide. The mixture was stirred at room temperature under nitrogen for 4 hours and then refluxed for 5 hours. The solvent was removed under reduced pressure and the residue washed thoroughly with water. The residue was heated with a mixture of 1500 ml. of dichloromethane and 1500 ml. of acetone and filtered, and the filtrate was concentrated under reduced pressure to an orange yellow solid. The residue was triturated with 250 ml. of hot acetone to give 4.10 g. of yellow crystals, M.P. 273–276° C. dec. Recrystallization was accomplished by dissolving in methanol and dichloromethane, treating with activated charcoal, filtering and concentrating the filtrate on a steam bath until crystals began to separate. Filtration gave 2.35 g. of 2'-methylthioyohimbano[17,18-4',5']pyrimidine as orange crystals, M.P. 280–285° C. dec.

EXAMPLE 33

*Preparation of 2'-hydroxyyohimbano[17,18-4',5']pyrimidine*

A mixture of 0.336 g. of 2'-methylthioyohimbano[17,18-4',5']pyrimidine and 15 ml. of concentrated hydrochloric acid was stirred and refluxed for 3 hours. An additional 5 ml. of concentrated hydrochloric acid was added and the mixture refluxed for an additional 4 hours. The resulting yellow precipitate was removed by filtration and washed thoroughly with water. The precipitate (0.335 g.) was dissolved in hot 50% aqueous ethanol and the solution was made slightly basic by the addition of concentrated ammonium hydroxide. Concentration of the solution under reduced pressure gave a gel which was removed by filtration and crystallized from a mixture of chloroform-methanol to yield 0.148 g. of tan crystals. Recrystallization from a mixture of chloroform and methanol afforded 0.055 g. of 2'-hydroxyyohimbano[17,18-4',5']pyrimidine as tan crystals, M.P. 280–285° C. dec. (with previous sintering).

EXAMPLE 34

*Preparation of 2'-phenylyohimbano[17,18-4',5']pyrimidine*

A mixture of 10.2 g. of 18-hydroxymethyleneyohimban-17-one, 6.26 g. of benzamidine hydrochloride, 2.0 g. of potassium hydroxide and 100 ml. of ethanol was stirred at room temperature for 20 hours and refluxed for 3.5 hours. The solvent was removed under reduced pressure and the residue triturated with water. Filtration gave a solid which was washed with water, dried, dissolved in chloroform-ethanol (99.5:0.5) and chromatographed over alumina to give 2'-phenylyohimbano-17,18-4',5']pyrimidine as yellow crystals, M.P. 304–307° C. dec.

EXAMPLE 35

*Preparation of 1'-acetylyohimbano[17,18-c]pyrazole*

A mixture of 3.0 g. of yohimbano[17,18-c]pyrazole, 15 ml. of triethylamine and 10 ml. of acetic anhydride was stirred at room temperature for 22 hours. The reaction mixture was then diluted with 50 ml. of absolute ethanol and concentrated to dryness under reduced pressure. A solution of the residue in dichloromethane was washed with saturated sodium bicarbonate and the dichloromethane solution was dried over magnesium sulfate and concentrated under reduced pressure. The residue was dissolved in benzene and then evaporated under reduced pressure to give a yellow glass. Trituration with absolute ethanol and filtration gave 1.90 g. of tan crystals, melting point 234–236° C. dec. Recrystallization from absolute ethanol gave 1.20 g. of 1'-acetylyohimbano[17,18-c]pyrazole as light tan crystals, melting point 247–250° C. dec.

What is claimed is:

1. A compound selected from the group consisting of ring E substituted yohimbanes of the formula:

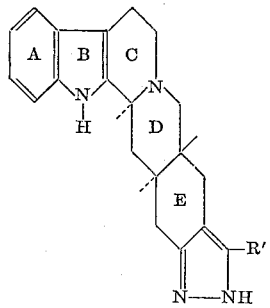

and the tautomer thereof, wherein R' is selected from the group consisting of hydrogen, lower alkyl, lower carboalkoxy, phenyl, (lower alkyl)phenyl, (halo)phenyl, (lower alkoxy)phenyl and 3,4,5-tri(lower alkoxy)phenyl; and the pharmaceutically acceptable acid-addition salts thereof.

2. Yohimbano[17,18-c]pyrazole.
3. 5'-methylyohimbano[17,18-c]pyrazole.
4. 5'-phenylyohimbano[17,18-c]pyrazole.
5. A compound selected from the group consisting of ring E substituted yohimbanes of the formula:

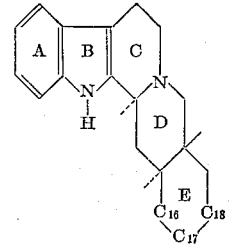

wherein —$C_{16}$—$C_{17}$—$C_{18}$— is a divalent radical selected from the group consisting of:

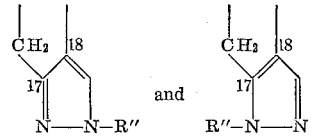

wherein R" is selected from the group consisting of lower alkyl, lower alkanoyl, phenyl and trimethoxybenzoyl; and the pharmaceutically acceptable acid-addition salts thereof.

6. 1'-methylyohimbano[17,18-c]pyrazole.
7. 1'-methylyohimbano[18,17-d]pyrazole.
8. 1'-phenylyohimbano[18,17-d]pyrazole.
9. A compound selected from the group consisting of ring E substituted yohimbanes of the formula:

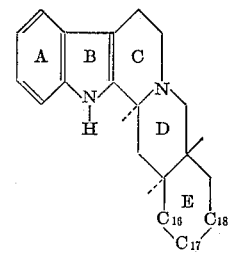

wherein —$C_{16}$—$C_{17}$—$C_{18}$— is a divalent radical selected from the group consisting of:

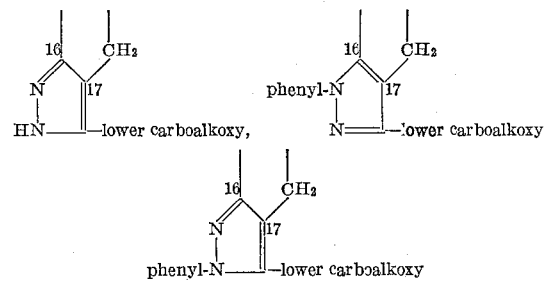

and tautomers thereof; and the pharmaceutically acceptable acid-addition salts thereof.

10. Ethyl yohimbano[16,17-c]pyrazole-5'-carboxylate.
11. Ethyl 1'-phenylyohimbano[16,17-c]pyrazole-5'-carboxylate.

12. A compound selected from the group consisting of ring E substituted yohimbanes of the formula:

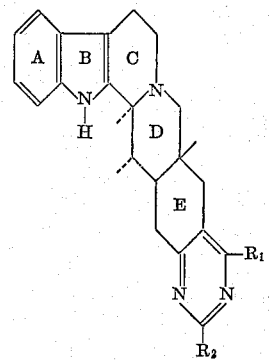

wherein $R_1$ is selected from the group consisting of hydrogen, lower alkyl, phenyl, (lower alkyl)phenyl, (halo) phenyl, (lower alkoxy)phenyl and 3,4,5, tri(lower alkoxy) phenyl, and $R_2$ is selected from the group consisting of hydrogen, hydroxy, amino, lower alkylthio, phenyl, (lower alkyl)phenyl, (halo)phenyl, (lower alkoxy)phenyl and 3,4,5-tri(lower alkoxy)phenyl; and the pharmaceutically acceptable acid-addition salts thereof.

13. 2' - amino - 6' - methylyohimbano[17,18 - 4',5'] pyrimidine.

14. 2' - amino - 6' - phenylyohimbano[17,18 - 4',5'] pyrimidine.

15. Yohimbano[17,18-4',5']pyrimidine.

16. 2'-aminoyohimbano[17,18-4',5']pyrimidine.

No references cited.

WALTER A. MODANCE, *Primary Examiner.*

J. A. PATTEN, *Assistant Examiner.*